(12) United States Patent
Sullivan

(10) Patent No.: US 11,475,475 B2
(45) Date of Patent: Oct. 18, 2022

(54) METHODS, SYSTEMS AND MEDIA PLATFORM FOR INCREASING ADVERTISEMENT ENGAGEMENT WITH USERS

(71) Applicant: Clix, Inc., Venice, CA (US)

(72) Inventor: Edward M. Sullivan, Marina Del Rey, CA (US)

(73) Assignee: Clix, Inc., Venice, CA (US)

( * ) Notice: Subject to any disclaimer, the term of this patent is extended or adjusted under 35 U.S.C. 154(b) by 0 days.

(21) Appl. No.: 16/812,298

(22) Filed: Mar. 7, 2020

(65) Prior Publication Data

US 2020/0286119 A1    Sep. 10, 2020

Related U.S. Application Data

(60) Provisional application No. 62/815,309, filed on Mar. 7, 2019.

(51) Int. Cl.
*G06Q 30/00*   (2012.01)
*G06Q 30/02*   (2012.01)
*G05B 19/418*   (2006.01)

(52) U.S. Cl.
CPC ................ *G06Q 30/0242* (2013.01)

(58) Field of Classification Search
CPC .................................. G06Q 30/0242
See application file for complete search history.

(56) References Cited

U.S. PATENT DOCUMENTS

| | | |
|---|---|---|
| 2004/0255322 A1 | 12/2004 | Meadows et al. |
| 2006/0212350 A1* | 9/2006 | Ellis ................ G06Q 30/0254 705/14.41 |
| 2008/0162282 A1 | 7/2008 | Gaylord |
| 2009/0204704 A1 | 8/2009 | Muret et al. |

(Continued)

FOREIGN PATENT DOCUMENTS

WO       2018183125 A1    10/2018

OTHER PUBLICATIONS

"Developing an index for measuring the engagement of internet media". IEEE. Oct. 1, 2008. (Year: 2008).*

(Continued)

*Primary Examiner* — Maria V Vanderhorst
(74) *Attorney, Agent, or Firm* — UltimatEdge IP Law Group, P.C.; Dean G. Stathakis

(57) ABSTRACT

The present system, method, and media platform provides tools for increasing advertisement engagement with users by incentivizing engagement with various content displayed within a graphical user interface of a device by providing rewards for such engagement. Content engagement includes interacting with the displayed content or sharing such content on social media and the like, or by any other various action and/or input received from the user indicative of content engagement as defined in a set of parameters provided at least in part by the owners of the content. Content owners can purchase rewards which are selectively, as defined by parameters, distributed to one or more user rewards account upon receiving an input indicating a selection by the user of the content displayed. The user advantageously seeks out the content due, in part, to the rewards offer and relevance to the user's interests.

20 Claims, 4 Drawing Sheets

(56) References Cited

U.S. PATENT DOCUMENTS

| | | | |
|---|---|---|---|
| 2013/0014137 A1* | 1/2013 | Bhatia | G06Q 30/0201 |
| | | | 725/9 |
| 2014/0149208 A1 | 5/2014 | Zwicky | |
| 2016/0149956 A1 | 5/2016 | Birnbaum et al. | |
| 2016/0203163 A1* | 7/2016 | Cadell | G06F 3/0484 |
| | | | 707/736 |
| 2018/0060901 A1* | 3/2018 | Lyndon-James | G06Q 50/01 |
| 2018/0300767 A1* | 10/2018 | Zaretsky | G06Q 30/0275 |
| 2020/0044998 A1* | 2/2020 | Jeon | G06Q 30/0252 |

OTHER PUBLICATIONS

WIPO, PCT Form ISA 210, International Search Report for IA Serial No. PCT/US2020/021602 (dated May 22, 2020).
WIPO, PCT Form ISA 237, Written Opinion for IA Serial No. PCT/US2020/021602 (dated May 22, 2020).

* cited by examiner

METHODS, SYSTEMS AND MEDIA PLATFORM FOR INCREASING ADVERTISEMENT ENGAGEMENT WITH USERS

CROSS-REFERENCE

This application claims the benefit of priority and the filing date pursuant to 35 U.S.C. § 119(e) to U.S. Provisional Patent Application 62/815,309, filed Mar. 7, 2019, the entire content of which is hereby incorporated by reference in its entirety.

BACKGROUND

The subject of this patent application relates generally to systems and methods, and a media platform for increasing advertisement engagement with users.

By way of background, advertisements are displayed before, during, after, or alongside a desired video stream or other media presentation and/or content. Often, advertisements are displayed prior to or during streaming the desired video, only permitting viewing of the desired video after the advertisement or after a predetermined period of time where a "skip" element may be provided to end the advertisement and begin the desired video. Further, advertisements may pop-over the desired video stream during the stream, obstructing the viewing window until being manually dismissed by selecting the close window element. Additionally, advertisement media may play within the application or browser window surrounding the desired video stream, thereby distracting the end user from peacefully viewing the desired content.

Accordingly, it is desirable to provide systems and methods, and media for increasing advertisement engagement.

Aspects of the present disclosed subject matter fulfill these needs and provide further related advantages as described in the following summary.

SUMMARY

Aspects of the present invention teach certain benefits in construction and use which give rise to the exemplary advantages described below.

The present invention solves the problems described above by providing, in some embodiments, a method for increasing advertisement engagement, comprising receiving, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content; receiving, from a user device, a request to present the content within a content page; causing the content to be presented within the media content page, wherein the content comprising a reward content and one or both of a media content and an advertisement content, the reward content being associated with one or both of the media content and the advertisement content, the reward content presenting the reward characteristic; receiving, from the user device, the user interaction input comprising an input indicating selection of the content; modeling the user interaction to increase advertiser engagement with users, by identifying trend and viewing characteristics for the content by separating content views by one or more of episode, series, channel, specific viewing platform, and user, and assessing trends based on one or more of campaign consumption, views by campaign, most popular content based on a number of views, and most popular content based on time watched, compiling user-centric analytics at least indicative of counts based on the user interaction, evaluating social media performance in social media-specific analytics by episode, channel, or series at least indicative of counts of views and a user sentiment relative to the content, and detecting fraudulent activity relative to the content, by collecting observed characteristics of user behavior, and measuring observed characteristics of user behavior against benchmarked and normalized typical user behavior to identify usage patterns of actual human users and detect automated, machine-based users, and modeling the observed characteristics of user behavior against known or expected ones of timing intervals, visits to specific areas, user flow characteristics, and consumption patterns for actual human users; and transferring, by a rewards server, the reward to the user rewards account.

As an option in some embodiments, the reward characteristic is a quantity of rewards points, the quantity of rewards points can be transferred to the user reward account, with the quantity of rewards points redeemable for money, goods, and/or services. The reward characteristic can be a discount offer redeemable for goods and/or services.

As an option in some embodiments, receiving the parameter can further comprise requesting a second reward having a second reward characteristic be associated with the advertisement content, the method can further comprise requesting that a second transfer of the second reward to the user rewards account be dependent on the occurrence of a second user interaction input; receiving, from the user device, the second user interaction input comprising a second input indicating the selection of the advertisement content; and transferring, by the rewards server, the second reward associated with the second reward characteristic to the user rewards account.

As an option in some embodiments, the media content can comprise a media thumbnail associated with a video stream, the method can further comprise causing the video stream to play upon receiving from the user device the input indicating the selection of the media thumbnail. The reward graphics can optionally, in some embodiments, be presented as part of the media thumbnail. As an option in some embodiments, the advertising content can comprise a brand graphic, the method further comprising causing the brand graphic to be presented within the media thumbnail and/or adjacent to the media thumbnail. Optionally, in some embodiments, presenting the brand graphic can further comprise presenting a first brand graphic and a second brand graphic within an advertisement region arranged adjacent to the media thumbnail. As an option, the brand graphic can be an on-screen graphic. As yet another option in some embodiments, presenting the brand graphic can further comprise presenting a first on-screen graphic and a second on-screen graphic. As an option in some embodiments, presenting the brand graphic can further comprise removing the on-screen graphic during one or both of playing the video stream and playing the video stream in full screen mode.

As an option in some embodiments, the input indicating selection of the content can comprise selecting the media content and/or selecting the advertisement content. As an option in some embodiments, the input indicating selection of the content can comprise selecting the advertisement content, and the method can further comprise causing an advertisement page to be presented on the user device. As an option in some embodiments, the method can further comprise receiving, from an advertiser device, a request to acquire a supply of rewards from which the reward is drawn. As an option in some embodiments, the supply of rewards can be a plurality of rewards points.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

In some embodiments, the present system and method provides a tool for increasing advertisement engagement by incentivizing engagement with various media displayed within a graphical user interface on a user device via a media platform, through providing rewards redeemable for money, goods, and services for interacting with the media displayed (e.g., selecting any suitable text, image, hyperlink, and/or user interface element, etc.) such as by interacting with advertisement content and/or media content (such as selecting content, viewing content to completion or partially, and the like), or by sharing content on social media and the like, or by other various action and/or inputs received from the user device indicative of engagement with the content as defined in a set of parameters provided at least in part by the advertiser. In some embodiments, advertisers purchase rewards as part of advertisement package, which are selectively distributed to one or more user rewards account upon receiving an input indicating selection of the content displayed within the user interface. With the present system and method, the user advantageously seeks out the advertisement content due, in part, to the rewards offer, and seeks out the media content due, generally in main part, to the user's interest in the subject matter and in part to the rewards offered for its viewing.

In some embodiments, the input indicating selection of the advertisement content causes an advertisement page to be presented with information regarding the advertiser, such as a website corresponding to a business associated with the advertisement, a page presenting a coupon associated with the advertisement, a website corresponding to a charity associated with the business (e.g., supported by the business for the purpose of generating good will) and/or any other suitable information.

Figure 1:
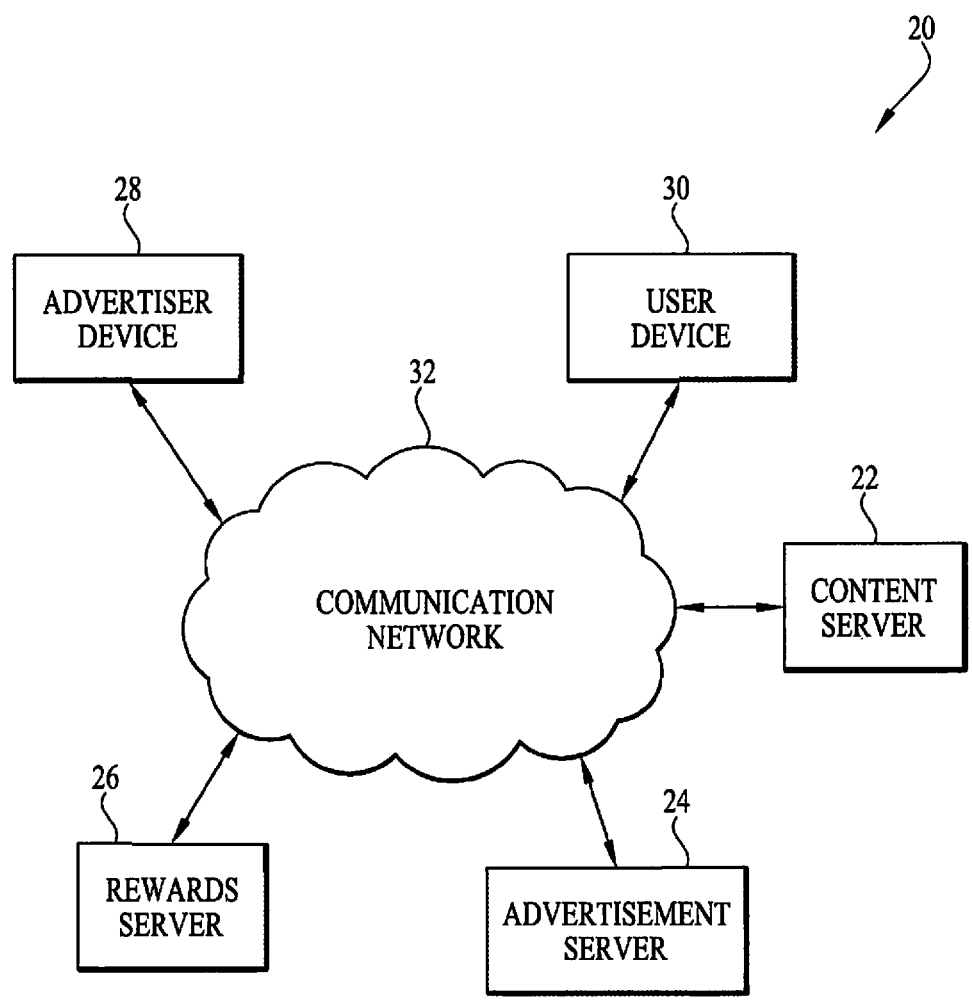
FIG. 1 shows a schematic diagram of an illustrative system suitable for implementation of mechanisms described herein for increasing advertisement engagement in accordance with some embodiments of the disclosed subject matter.

Turning to FIG. 1, an example of hardware components in a network or system comprising a media platform 20 for increasing advertisement and content engagement with users that can be used in accordance with some embodiments of the disclosed subject matter is shown. As illustrated, the hardware can include one or more servers such as a content server 22, an advertisement server 24, and a rewards server 26, and/or one or more user devices, such as an advertiser device 28 and a user device 30. These hardware elements are configured to execute software tools within the media platform 20 for modeling user interaction using a plurality of analytical functions to increase advertiser engagement with users.

Computer networks are well known in the art, often having one or more client computers and one or more servers, on which any of the methods and systems of various disclosed embodiments may be implemented. In particular the computer system, or server in this example, may represent any of the computer systems and physical components necessary to perform the computerized methods discussed in connection with the present figures and, in particular, may represent a server (cloud, array, etc.), client, or other computer system upon which e-commerce servers, websites, databases, web browsers and/or web analytic applications may be instantiated.

The optional illustrated exemplary content server 22, advertisement server 24, rewards server 26, advertiser device 28, and user device 30 are generally known to a person of ordinary skill in the art, and each may include a processor, a bus for communicating information, a main memory coupled to the bus for storing information and instructions to be executed by the processor and for storing temporary variables or other intermediate information during the execution of instructions by processor, a static storage device or other non-transitory computer readable medium for storing static information and instructions for the processor, and a storage device, such as a hard disk, may also be provided and coupled to the bus for storing information and instructions. The content server 22, advertisement server 24, rewards server 26, advertiser device 28, and user device 30 may optionally be coupled to a display for displaying information. However, in the case of servers 22, 24, 26, such a display may not be present and all administration of the server may be via remote clients. Further, content server 22, advertisement server 24, rewards server 26, advertiser device 28, and user device 30 may optionally include connection to an input device for communicating information and command selections to the processor, such as a keyboard, mouse, touchpad, microphone, and the like.

Any suitable computer readable media can be used for storing instructions for performing the present functions and/or processes. For example, computer readable media can be transitory or non-transitory. Non-transitory computer readable media can include media such as magnetic media (e.g., hard disks, floppy disks, and/or any other suitable magnetic media), optical media (e.g., compact discs, digital video discs, Blu-ray discs, and/or any other suitable optical media), semiconductor media (e.g., flash memory, electrically programmable read-only memory, electrically erasable programmable read-only memory, and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

At the outset, it should be noted that communication between content server 22, advertisement server 24, rewards server 26, advertiser device 28, and user device 30 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the servers and devices are intended to include any type of computing or electronic device now known or later developed, such as desktop computers, mobile phones, smartphones, laptop computers, tablet computers, virtual reality systems, personal data assistants, gaming devices, POS systems, vending machines, unattended terminals, access control devices, point of interaction ("POI") systems, etc.

The content server 22, advertisement server 24, rewards server 26, advertiser device 28, and user device 30 may also include a communication interface coupled to the bus, for providing two-way, wired and/or wireless data communication to and from the server and/or client computers. For example, the communications interface may send and receive signals via a local area network, public network, intranet, private network (e.g., a VPN), or other network, including the Internet.

In the present illustrated example, the hard drive of the servers 22, 24, 26 (including optional third party servers and/or mobile app backend service, and the like) and/or one or all of the devices 28, 30 can be encoded with executable instructions, that when executed by a processor cause the processor to perform acts as described in the methods of the figures and description. The servers 22, 24, 26 communicate through the Internet, intranet, or other network with the devices 28, 30 to cause information and/or graphics to be displayed on the screen, such as HTML code, text, images, and the like, sound to be emitted from the speakers, etc. The servers 22, 24, 26 may host a URL site with information and media, which may be accessed by the devices 28, 30. Information transmitted to the client computer may be stored and manipulated according to the methods described below, using the software encoded on device. Although the computing devices are illustrated schematically, the computing devices may include laptops, desktops, tablets, cellular devices (e.g., smart phones, such as iOS devices, ANDROID devices, WINDOWS devices, and the like), or any other computing device now known or later developed.

Still looking at FIG. 1, the devices 28, 30 may be one of many available computing devices capable of running executable programs and/or a browser instance. For example, they may be a mobile device, such as a tablet computer or a mobile phone device with computer capabilities, a laptop, a desktop, or other computing device. Executable instructions for the present method may be installed on one or more of the servers 22, 24, 26 that hosts a web application caused to display a graphical user interface on one or all of the devices 28, 30. Alternatively, executable instructions for all or at least part of the present method may be installed locally on one or more of the devices 28, 30, such as a smartphone, and the like. In some example embodiments, the devices 28, 30 access and interact with the graphical user interface through a web browser instance, such as FIREFOX, CHROME, SAFARI, INTERNET EXPLORER, and the like, or through a desktop application or other application. The web application is hosted on a server with application hosting capabilities. In some example embodiments, the client devices 28, 30 can access and interact with the graphical user interface through either a web application running on a mobile web browser or a mobile application (commonly called an "app").

Alternatively, executable instructions for carrying out all or at least part of the present method may be installed locally on one or more of the devices 28, 30. For example, one or more of the devices 28, 30 may be required to locally install an application on a smartphone device for carrying out all or part of the present method. In an example embodiment, an executable application file is installed on each of the devices 28, 30 so that messages can be sent to and received from the servers 22, 24, 26 (or between the servers 22, 24, 26 or between the devices 28, 30), with the server sending, receiving, and/or relaying the messages to one or more of the client devices 28, 30. The messages may be comprised of various forms of data, such as alpha-numeric text, pictures, streaming videos, animations, links, and so on. In yet another example embodiment, one party may have an application installed on the computing device, while the other party sends and receives messages through a browser instance.

The advertisement server 24 can be any suitable server for receiving parameters from the advertiser device 28 or other suitable device and/or server. In one or more example embodiments, the advertisement server 24 can receive parameters that include a request that a reward be associated with media content or advertisement content, an indication of the reward characteristic (such as, for example, a quantity of rewards points, a discount offer such as a coupon, or other suitable reward to aid in enticing the user to interact, e.g., "click" or select the content), the total rewards points available for distribution or transfer to user rewards accounts, the nature or quantity of rewards points awarded for each user interaction with content (where a user interaction with content can include, in one or more example embodiments, sharing content, merely selecting content, viewing part or all of the content, selecting a media thumbnail, selecting a specific advertisement, selecting a reward graphic, selecting a brand graphic, or other behavior desired by the advertiser as specified in the parameters and/or as specified by other interested parties). In some embodiments, advertisement server 24 can be omitted.

The content server 22 can be any suitable server for storing media content and/or delivering the media content to user device 30 and/or the advertiser device 28. In one or more example embodiments, the content server 22 can be a server that streams or otherwise transmits media content to user device 30 through the communication network 32. Content provided by content server 22 can be any suitable content, such as reward content, media content, advertisement content, video content, audio content, electronic books, documents, images, and/or any other suitable type of content. For example, content can further include, in one or more example embodiments, television programs, programs that are part of a series of related programs and/or are part of a channel, movies, cartoons, live-streamed content, and/or any other suitable type of content. Content can be created or uploaded to the content server 22 by any suitable entity. Advertisement content can be uploaded to the content server 22 via the advertiser device 28 through an advertiser interface or the like. In some embodiments, content server 22 can be omitted.

The rewards server 26 can be any suitable server for managing user and advertiser accounts, storing data related to rewards, distributing rewards, redeeming rewards for products, cash or cash equivalents, and/or services and/or experiences (or other appropriate tangible or intangible valuables), receiving instructions to transfer rewards from an advertiser account to a user account, and/or from one user account to another user account (e.g., to share rewards between two or more user accounts, or the like, such as sharing or other transactions between friends, family, etc.), and/or from one advertiser account to another advertiser account (e.g., when an advertiser has an account for each of several advertising campaigns, and/or when an agency manages multiple accounts from several advertiser companies and may need to transfer rewards between accounts, and so on), and other functions related to a rewards system. In one or more example embodiments, an advertiser can acquire rewards (for example, in the form of a large quaintly of rewards points) which are distributable to numerous user accounts in which the associated devices upon which the user is signed in perform the required interaction with the presented content as defined, wholly or in-part, in the parameters established by the advertiser and/or the system. In one or more example embodiments, an advertiser can establish an advertisement campaign, in which the right to sponsor a particular media content (e.g., a particular series, and/or a particular celebrity or talent, and/or a particular video or set of videos, and any appropriate content which the user may choose to consume) is negotiated. In one or more example embodiments, as part of the advertisement campaign, the advertiser or agent (or other appropriate entity and/or person and/or group of persons) can choose to distribute rewards to entice the user to interact with various fields within the user interface (such as a web page within a browser instance, the graphical user interface of a mobile application, or other appropriate means to access digital content). In one or more example embodiments, the advertiser may also choose to associate the brand with a charity (such as a non-profit, a particular cause, and the like), where rewards and/or money and/or other resources can be distributed to the charity upon a user interaction with a media associated with the charity (such as selecting the charity icon or graphic to open a charity website and/or modal, and/or sharing the charity information, and/or any other media presented on one or more of the content pages). In one or more example embodiments, rewards and/or money and/or other resources can be distributed to the charity upon a user interaction with any media presented on the media page, such as the media associated with the advertiser brand, and other interactions as indicated, wholly or in-part by the parameters. In one or more example embodiments, the rewards server 26 (or other appropriate server) can negotiate the redemption of rewards point or other rewards for valuables, where a redemption value can be changeably defined within the system, such as establishing the quantity of rewards points required in exchange for a given amount of money in a specified currency (such as the number of points required in exchange for each U.S. dollar) and/or the value of a product, service, and/or experience and the like as measured in rewards points. Upon redemption, the redeemed rewards are withdrawn from the user account, and the desired valuable transferred to the user by means known in the art (e.g., a transfer to a bank account, the transmission of a gift card and/or a cash card or the like, the shipment of a product, the transmission of a coupon, and so on). In some embodiments, rewards server 26 can be omitted.

In the illustrated embodiment of FIG. 1, the content server 22, the advertisement server 24, and the rewards server 26 are shown as separate devices, however the functions performed by these servers 22, 24, 26 can be performed using any suitable number of devices in one or more example embodiments. The functions performed by one or more of the content server 22, the advertisement server 24, and the rewards server 26 can be performed on a single server. Further, in one or more example embodiments, multiple devices can be used to implement the functions performed by the content server 22, the advertisement server 24, and the rewards server 26. Likewise, in one or more example embodiments, the user device 30 and the advertiser device 28 may be any number of suitable devices to accommodate access by multiple advertisers and multiple end-users.

Together, the content server 22, the advertisement server 24, and the rewards server 26 are hardware elements that operate in conjunction with software elements to perform a number of analytical functions within the media platform 20 comprising the network or system for increasing advertisement and content engagement. These servers 22, 24, 26 are configured to execute a plurality of data processing modules embodied in such software elements that are components within a computing environment that may also include one or more processors as well as the plurality of additional software and hardware components, as noted above. The one or more processors, the various software and hardware components, are configured to execute program instructions routines, sub-routines, and other software elements stored within at least one computer-readable non-transitory storage medium to at least perform the analytical functions described herein, and embodied within the plurality of data processing modules. The computing environment may also be, at least in part, a cloud-based environment. Accordingly, and regardless of whether the content server 22, the advertisement server 24, and the rewards server 26 are comprised as separate devices, or as single or multiple devices in each case, it is to be understood that they operate at least in part within such a computing environment, and further within which the media platform 20 for increasing advertisement and content engagement is implemented and operable.

The analytical functions of the media platform 20 arise from detailed and extensive data collection, and include pervasive metrics representing trends and viewing characteristics extracted from such data about the use, viewing, and interactions by users on the platform comprising the media platform 20. These metrics at least include aggregated information representing user interactions with content and deeper user content engagement, such as total views by episode, total views by series, all views aggregated by episode, and all views aggregated by series. Other aggregated information includes all views cumulative by channel, all views cumulative by series, total views by specific platform, and active unique users. Additional aggregated information that is possible includes assessment of trends and other viewing characteristics, such as trending brand views, campaign consumption, trending video views by campaign, top video by views, and top videos by time watched.

The analytical functions also enable compilation of, and development of, advanced metrics that are more user-centric and represent both user interaction and deeper user content engagement. User-centric metrics include counts of active users, all site visitors, new site visitors, new subscribers, returning users, users separated by geographical location (such as for the example the top 10 countries), and users separated by operating system. Such user-centric metrics may also include more in-depth and follow-on analytics, such as a conversion ratio indicative of new users who become returning users, site visitors who become subscribers, site visitors by country or geographical location who do or do not become subscribers, etc.

Other analytical functions include social media-specific analytics, either by episode, by channel, or by series. For example, social metrics may be derived based on social media views by episode, social media views by social channel, and social media views by series. Social metrics may also result from performing a sentiment analysis to discern user sentiment from user engagement with content, for example from "likes" by users of social media. As with views, the present invention may track such a "like" interaction by episode, social channel, or series. As some channels have different categories of "likes" (for example, "celebrates" or "disapproves"), the social metrics aspect of the analytical functions of the present invention may also break down the type of "like" by episode, channel, or series.

The media platform 20 may model user sentiment relative to particular content presented in such a sentiment analysis using many different techniques to develop these social media-specific analytics (and other types of analytics as well), and may use this information to perform deeper analytics such as when content was viewed or liked more highly or more definitively in time, and compare such information with other environmental data or conditions. For example, a time-series analysis may be applied on user "likes" to determine when user engagement with social media was high or low, and then examine other information, such as reactions to other events happening at those same moments, such as across similar social media platforms or by users having similar profiles, to discern more specific reasons for the user engagement.

The present invention also includes a fraud detection component, which is a data processing function that performs analytics to detect fake/fraudulent users and malicious usage on the media platform 20. The present invention applies a combination machine learning and analytical software tools to benchmark and normalize typical user behavior and identify usage patterns of actual human users. Benchmarking within the fraud detection component applies one or more software tools to identify user sessions generated by a computer system or other automation technology (such as bots) on a periodic basis as required, such as for example daily or hourly.

The fraud detection component models usage patterns of typical users by observing and examining different characteristics of user behavior. For example, the present invention calculates a timing interval between the clicks or taps users perform as they progress through interfaces on websites and/or mobile applications through which the media platform 20 is accessed. The present invention also marks specific areas within such interfaces that are visited frequently and regularly by users, tracks common user flow characteristics within the interfaces, and consumption patterns for content available via those interfaces. These are modeled against known or expected ones of timing intervals, visits to specific areas, user flow characteristics, and consumption patterns for actual human users, and an algorithm is applied to determine whether it is likely that the generation of observed characteristics is human or machine-based. Depending on the content presented or the organization of such content (or both), the present invention may apply weights to each of these observed characteristics based on importance or likelihood, or determining whether a user is more likely or less likely to be a machine-based automation.

Once identified to a degree of certainty using the fraud detection component, fake or machine-generated user accounts are immediately deactivated and removed from the media platform 20. Also, any usage data or metrics generated by the fake or machine-generated account(s) are also deleted from the data set from which the analytical functions discussed herein draw from.

In addition, the fraud detection component's ability to benchmark typical user behavior and usage patterns also includes functions that are able to perform deeper analytics into collected data relative to usage patterns. For example, the fraud detection component may include one or more software tools configured to generate usage heatmaps, identify user geo-location coordinates (and other demographics relative to the user's geographical location), identify user device types and operating systems, calculate timing statistics between navigation or time spent on interface pages and/or elements thereof, and count the number of user views of a specific page, video, or other element within an interface. Further, this information may be configured for display as a list, report, or other arrangement of data, which may provide users with valuable brand association information. Therefore, the present invention may provide output data to users to improve marketing campaigns and better associate consumable content with branding that includes or is derived from such deeper analytics.

As noted above, the present invention may incorporate one or more techniques of machine learning, and apply proprietary rules identifying such techniques of machine learning to analyze the data and metrics produced by the analytical functions. Machine learning is an application of artificial intelligence in which algorithms are deployed to evaluate data, learn from that data, and make informed decisions based on what was learned. Specific machine learning models can be developed to focus on particular issues to be solved by such informed decisions. In the present invention, the media platform 20 may be configured to apply such techniques to improve at least upon the identification of whether a human user or a machine-based user is accessing content on an interface by inferring distinctions based on past displays of content as new displays are generated for user content. For example, the present invention may be configured to apply learned characteristics from prior displays of content to future instantiations of content displayed via an interface, such as where the model "learns" that a particular video file is comprised of a song, and in a song the user usually waits until the end of the song to hear the most powerful vocal portions thereof. In such an example, where the fraud detection component identifies the video file as a song, it will understand that it must examine human-user characteristics as typically waiting for a certain portion of the file to have elapsed before moving on and viewing other content on the interface.

Together, these analytical functions enable several further features of the media platform 20. For example, they enable ensuring and enforcing brand integrity for advertisers, by associating and matching individual brands with specific content, celebrities, social media influencers, and charities within the media platform 20 to reinforce a brand's core identity and desired affiliations for improved advertisement engagement. It should be noted that the present invention is not limited to any particular metric described herein, and that many other data metrics are possible and within the scope of the present invention for associating and matching brands with specific content, celebrities, social media influencers, and organizations such as charities.

Figure 4:
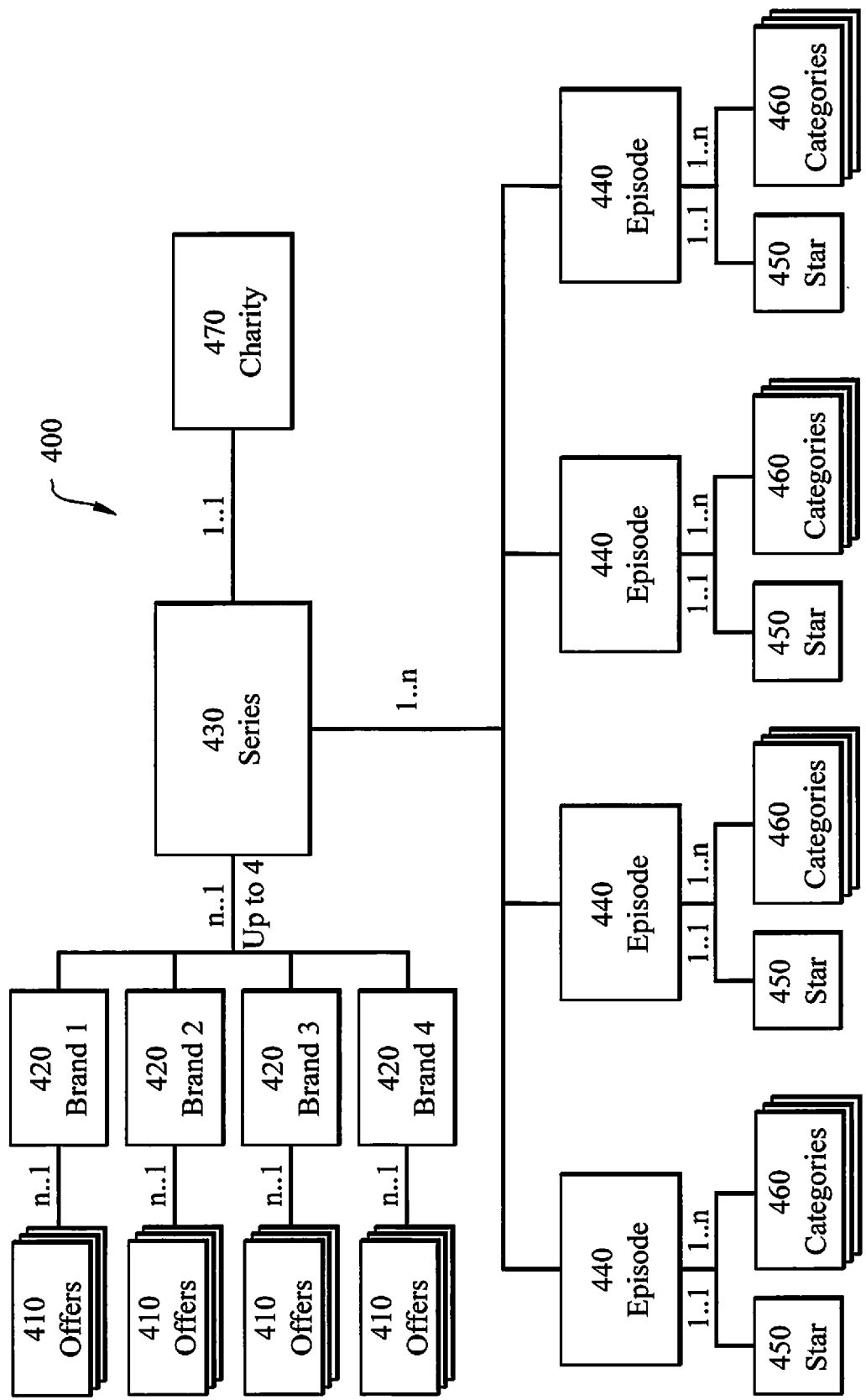
FIG. 4 shows an example of an object entity relationship diagram that illustrates how specific objects are connected within a media platform for increasing advertisement and content engagement with users in accordance with some embodiment of the disclosed subject matter.

FIG. 4 is an object entity relationship diagram that illustrates how specific objects, such as brands, episodes, celebrities, stars, influences, charities, etc. are connected in a defined entity relationship structure 400 within the media platform 20. This defined entity relationship structure 400 ensures that brands will only be associated with defined and approved content and celebrities. The defined entity relationship structure 400 therefore also ensures that random associations, such as with pre-roll, interstitial, and post-roll advertisements, do not occur with the media platform 20. The defined entity relationship structure 400 is an architecture for data flow within the media platform 20, and within which user interaction is analyzed in the analytical functions to model user engagement with content presented thereon.

As FIG. 4 illustrates, offers or rewards 410 may each be associated with a particular brand 420, and distributed for presentation in a series 430. A series 430 may be distributed for consumption by a specific organization or charity 470. Each series may be comprised of episodes 440, and within each episode, a star, celebrity, or influencer 450 is associated with a brand 420 and an offer 410.

As noted in FIG. 4, there may be n instances of offers 410, but they will be brand-specific, and therefore only associated with designated stars, celebrities, or influencers 450, and only as to specific categories 460, such that categories 460 may be included to differentiate offers 410 and brands 420 from each other, so that brands will only be associated with defined and approved content, and defined and approved stars, celebrities, or influencers 450, and also that random instantiations of offers 410 and brands 420 do not occur.

Figure 2:
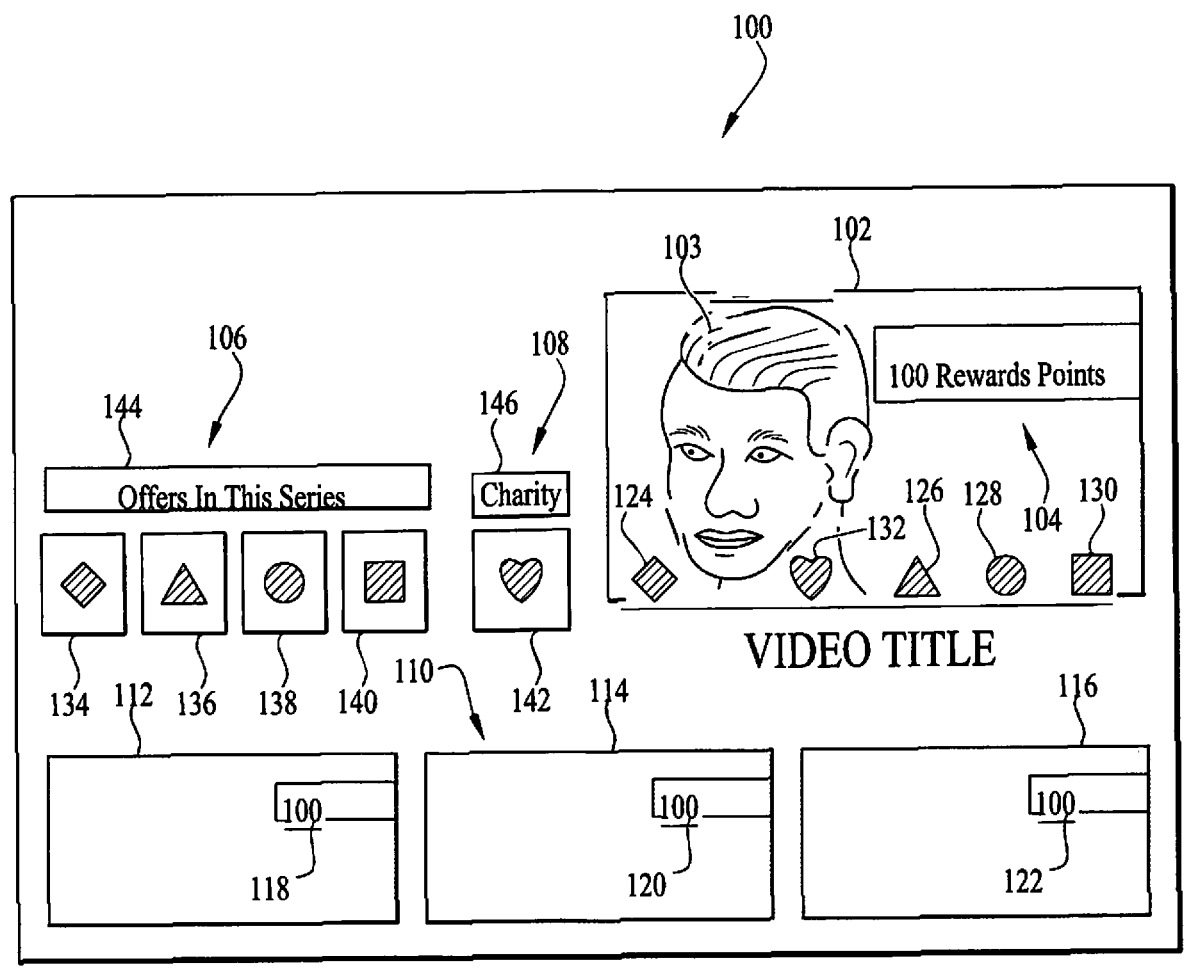
FIG. 2 is a simplified schematic view of an exemplary user interface for receiving media using one or more computing devices, in accordance with some embodiments of the disclosed subject matter.

Turning now to FIG. 2, a simplified example embodiment of a user interface 100 for displaying or otherwise presenting media content is illustrated in accordance with some embodiments of the disclosed subject matter. The example user interface 100 illustrated includes various forms of content, such as a primary media thumbnail 102, a rewards graphic 104 positioned (in on or more embodiments) at least partially within the bounds of the primary media thumbnail 102 and communicating a reward characteristic ("100 Reward Points" in this example), and advertisement region 106 adjacent to the primary media thumbnail 102 (or at least on the user interface 100 page separate from the primary media thumbnail 102), a charity region 108, and a secondary media thumbnails region 110 with one or more media thumbnails 112, 114, 116 each with a specific rewards graphic 118, 120, 122 respectively.

In one or more embodiments, the primary media thumbnail 102 element is prominently displayed within the example user interface 100, preferably but not necessarily, being the largest element on the user interface 100 page. In this example embodiment, the primary media thumbnail 102 is associated with a video stream (with the video stream visually represented by a preview image 103, series of images, and/or preview video, such as a GIF format video or a video clip of any appropriate resolution). Although the rewards graphic 104 is shown as being continually visible overtop the primary media thumbnail 102, in one or more embodiments, the rewards graphic 104 can optionally be caused to display when the user interacts with the primary media thumbnail 102 (e.g. when hovering a curser over the primary media thumbnail 102 and/or initially selecting the primary media thumbnail 102, and/or other appropriate interaction), otherwise the rewards graphic 104 can be hidden (e.g., not visible), made translucent to a large or small degree, the image of the rewards graphic 104 can be caused to change to a second image of an outline of the rewards graphic 104, and so on.

In one or more example embodiments, the rewards graphic 104 can have a dynamically changing reward characteristic, where the reward amount may change over time, by changing the nature or amount of the reward (e.g., from points to product discount offers) to reflect the behavior of the user and/or to shift between rewards when it is determined that the user has either already engaged with the element associated with the reward (e.g., the user has selected the primary media thumbnail 102 and at least partially viewed the associated video stream) or that the user has not engaged with the element associated with the reward for a defined period of time (e.g., the reward point offered may increase or decrease incrementally or continually change over time and/or change once after the expiration of the defined period of time). In one or more example embodiments, the rewards graphic 104 may be removed or otherwise become inaccessible to the user once the streaming video has been viewed and/or the reward characteristic may change once the video stream has been viewed (e.g., the reward characteristic "100 Reward Points" can be caused to become invisible or translucent to indicate to the user the reward has been earned by the user or is otherwise no longer accessible to the user. In some embodiments, the reward graphic can be omitted.

In one or more example embodiments, the primary media thumbnail 102 can include one or more on-screen graphics, which may be translucent and/or opaque. In the illustrated example embodiment, the on-screen graphics comprise a first brand logo 124, a second brand logo 126, a third brand logo 128, a fourth brand logo 130, and a charity logo 132. These on-screen graphics communicate to the user the brand or brands that support of the video content represented by the primary thumbnail 102 and/or the video stream associated with the primary thumbnail 102. In one or more example embodiments, each of the on-screen graphics, the brand and charity logos 124, 126, 128, 130, 132 in this example, is linked to advertisement content. Upon selecting any one of the logos 124, 126, 128, 130, 132, an advertisement page (not illustrated) is caused to be displayed in modal, a pop-up window, a new window, a new browser instance, a new browse tab, and/or any appropriate display mechanism, where a user may earn additional rewards for viewing advertisement content within the advertisement page. The logos 124, 126, 128, 130, 132 can be caused to display overtop the streaming video content, and/or hidden after a predetermined period of viewing time and/or when in a particular viewing mode, such as full screen mode. Although the on-screen graphics, in the form of logos 124, 126, 128, 130, 132, may or may not display a reward characteristic associated with interacting with one or more of the logos 124, 126, 128, 130, 132, a reward may be still accrued by the user as a result of the interaction. In one or more example embodiments, the reward characteristic may be caused to displayed upon hovering a cursor over one or more of the logos 124, 126, 128, 130, 132 (or through other appropriate means used to investigate elements within a page by users). In some embodiments, the on-screen graphics can be omitted.

In one or more example embodiments, the example user interface 100 further includes the secondary media thumbnails region 110 with one or more media thumbnails 112, 114, 116 each with a specific rewards graphic 118, 120, 122 displayed respectively. The thumbnails 112, 114, 116 are generally smaller than the primary media thumbnail 102. The thumbnails 112, 114, 116 can, in some embodiments, be associated with streaming video content related to the streaming video content of the primary media thumbnail 102 (e.g., further episodes in a series, streaming video content sharing sponsorship with the video streaming video content of the primary media thumbnail 102, a favorites list, a play list, a third person play list, streaming video content with the same and/or similar talent and/or subject matter as the streaming video content of the primary media thumbnail 102, and so on). Selecting any one of the thumbnails 112, 114, 116 will cause the example user interface 100 page to refresh with the selected thumbnail enlarged and made primary or causing the streaming video content associated with that selected thumbnail to immediately stream the video. In some embodiments, the secondary media thumbnails region 110 can be omitted.

In one or more example embodiments, the example user interface 100 further includes the advertisement region 106 and the charity region 108. In one or more example embodiments, the advertisement region 106 can include a header graphic 144 which communicates that the advertisement region 106 includes offers which may be of interest to the user. The header graphic 144 is a horizontally oriented bar with a text graphic communicating "Offers In This Series". Beneath the header graphic 144 is one or more brand elements 134, 136, 138, 140, each having a graphic (e.g., a logo, a picture, alpha-numeric text, or any appropriate means to communicate a brand to a user) within the element. For example, it can be seen that the first brand logo 124 is displayed within the first element 134, the second brand logo 126 is displayed within the second element 136, the third brand logo 128 is displayed within the third element 138, and the fourth brand logo 130 is displayed within the fourth element 140. Much like the selecting the logos when displayed as on-screen graphics, when the user selects any one of the brand elements 134, 136, 138, 140, the advertisement content associated with the selected element will be caused to be presented. Further, a reward can be associated with the interaction of each of the brand elements 134, 136, 138, 140. The rewards may vary according to the parameters provided by the advertiser device 28. Further, in one or more example embodiments, two or more advertisers may share the burden of provided rewards for interaction with the media content (e.g., each provides a portion of total rewards points displayed in the rewards graphic 104. The charity region 108 similarly includes a header graphic 146 with a charity element 142 there below. The charity element 146 includes a charity graphic within the charity element 142 (the charity logo 132 in this example). A user interaction with the charity element calls up a charity page (not illustrated) which includes media associated with the charity, and optionally, any of the advertisement brands associated with the charity. A donation can be transferred to the charity organization, in one or more embodiments, underwritten at least in-part by one or more of the advertisers. The user may also be invited to donate, share, and/or promote the charity and/or cause.

Figure 3:
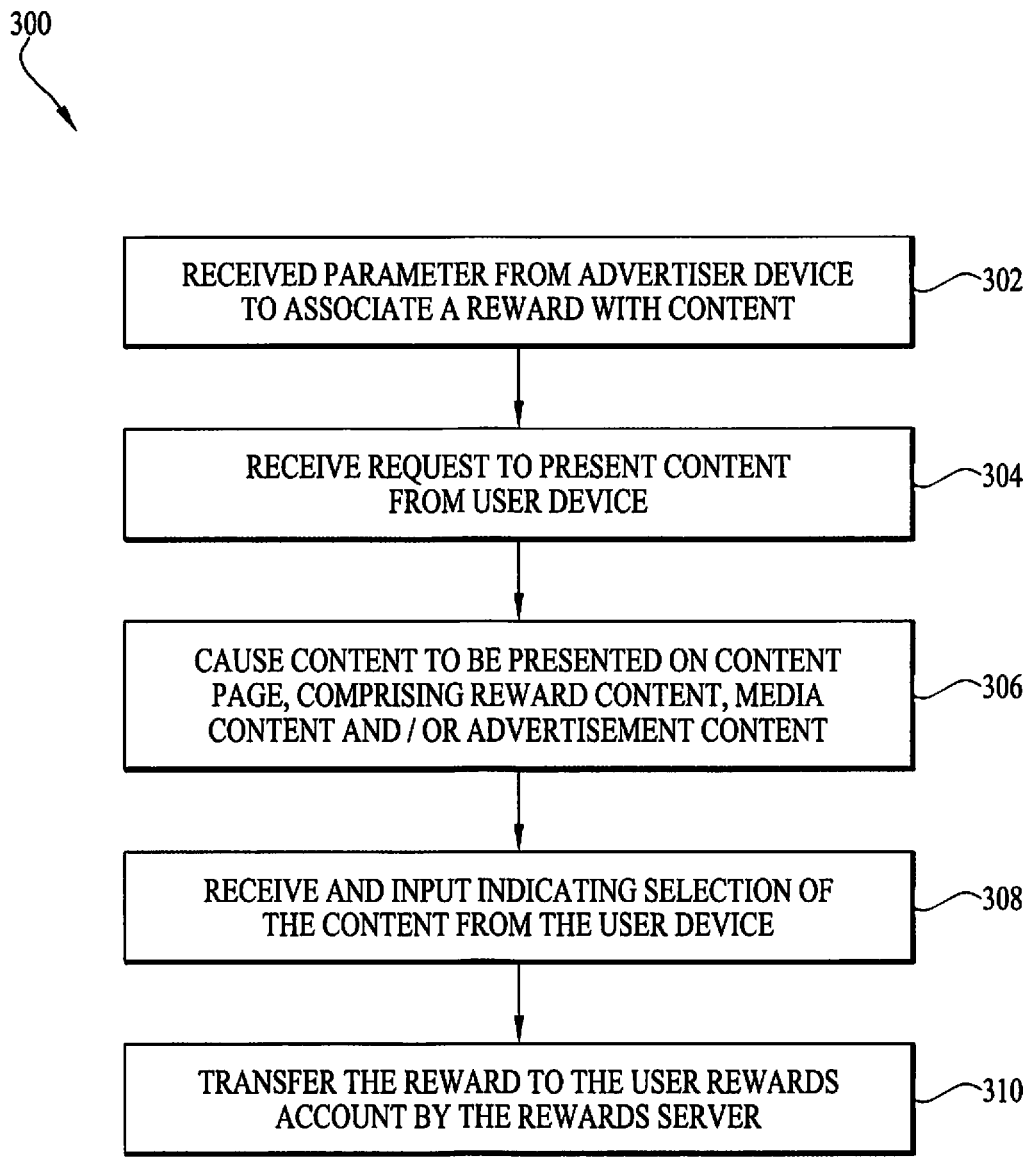
FIG. 3 shows an example of a process for receiving parameters for associating a reward sponsored by an advertiser with media displayed in the user interface for distribution of the reward to the user rewards account upon interaction with the media in accordance with some embodiments of the disclosed subject matter.

Turning to FIG. 3, an example 300 of a process within the media platform 20 is shown in accordance with one or more embodiments of the disclosed subject matter.

Process 300 can begin by receiving a parameter from the advertiser device 28 which requests the association of a reward with content at 302, as described above. The parameter may specify that a predetermined reward be transmitted to a user rewards account upon the occurrence of a user interaction input, such as selecting video content, advertiser content, and/or other content presented on the various pages of the graphical user interface of the present system.

Process 300 can receive a request to present content within a content page, which is transmitted from the content server at 304. Additionally, advertisement content can be requested as part of the content page, as described above. Process 300 can cause the content to be presented within the content page at 306, where the content comprises reward content, media content, and/or advertisement content.

Process 300 can receive an input indicating selection of the content from the user device at 308, which, as described above, can include interaction with the streaming video content (e.g., watching at least a portion of the video content and/or watching it to completion, or other appropriate defined interaction from which a reward is associated). Process 300 can transfer the reward to the user rewards account at 310.

Aspects of the present specification may also be described as follows:

1. A method for increasing advertisement engagement, comprising: receiving, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content; receiving, from a user device, a request to present the content within a content page; causing the content to be presented within the media content page, wherein the content comprising a reward content and one or both of a media content and an advertisement content, the reward content being associated with one or both of the media content and the advertisement content, the reward content presenting the reward characteristic; receiving, from the user device, the user interaction input comprising an input indicating selection of the content; modeling the user interaction to increase advertiser engagement with users, by: identifying trend and viewing characteristics for the content by separating content views by one or more of episode, series, channel, specific viewing platform, and user, and assessing trends based on one or more of campaign consumption, views by campaign, most popular content based on a number of views, and most popular content based on time watched, compiling user-centric analytics at least indicative of counts based on the user interaction, evaluating social media performance in social media-specific analytics by episode, channel, or series at least indicative of counts of views and a user sentiment relative to the content, and detecting fraudulent activity relative to the content, by collecting observed characteristics of user behavior, and measuring observed characteristics of user behavior against benchmarked and normalized typical user behavior to identify usage patterns of actual human users and detect automated, machine-based users, and modeling the observed characteristics of user behavior against known or expected ones of timing intervals, visits to specific areas, user flow characteristics, and consumption patterns for actual human users; and transferring, by a rewards server, the reward to the user rewards account.

2. The method of embodiment 1 wherein the reward characteristic is a quantity of rewards points, the quantity of rewards points are transferred to the user reward account, the quantity of rewards points redeemable for one or more of money, goods, and services.

3. The method of embodiment 1 or 2, wherein the reward characteristic is a discount offer redeemable for goods and/or services.

4. The method of any one of embodiments 1-3, wherein receiving the parameter further comprises requesting a second reward having a second reward characteristic be associated with the advertisement content, the method further comprising: requesting that a second transfer of the second reward to the user rewards account be dependent on the occurrence of a second user interaction input; receiving, from the user device, the second user interaction input comprising a second input indicating the selection of the advertisement content; transferring, by the rewards server, the second reward associated with the second reward characteristic to the user rewards account.

5. The method of any one of embodiments 1-4, wherein the media content comprises a media thumbnail associated with a video stream, the method further comprising: causing the video stream to play upon receiving from the user device the input indicating the selection of the media thumbnail.

6. The method of any one of embodiments 1-5 further comprising presenting the reward graphic as part of the media thumbnail.

7. The method of any one of embodiments 1-6, wherein the advertisement content comprises a brand graphic, the method further comprising: causing the brand graphic to be presented within the media thumbnail and/or adjacent to the media thumbnail.

8. The method of embodiment 7 wherein the brand graphic further comprises presenting a first brand graphic and a second brand graphic within an advertisement region arranged adjacent to the media thumbnail.

9. The method of embodiment 7 or 8, wherein the brand graphic is an on-screen graphic.

10. The method of any one of embodiments 7-9, wherein presenting the brand graphic further comprises presenting a first on-screen graphic and a second on-screen graphic.

11. The method of any one of embodiments 7-10, wherein presenting the brand graphic further comprises removing the on-screen graphic during one or both of playing the video stream and playing the video stream in full screen mode.

12. The method of any one of embodiments 1-11, wherein the input indicating selection of the content comprises selecting the media content and/or selecting the advertisement content.

13. The method of any one of embodiments 1-12, wherein the input indicating selection of the content comprises selecting the advertisement content, the method further comprising: causing an advertisement page to be presented on the user device.

14. The method of any one of embodiments 1-13 further comprising: receiving, from an advertiser device, a request to acquire a supply of rewards from which the reward is drawn.

15. The method of any one of embodiments 1-14, wherein the supply of rewards is a plurality of rewards points.

16. The method of any one of embodiments 1-15, wherein the determining user-centric analytics further comprises counting a number of active users, all site visitors, new site visitors, new subscribers, returning users, users by specified geographical location, and users by operating system.

17. The method of any one of embodiments 1-16, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces.

18. The method of any one of embodiments 1-18, wherein the analyzing fraudulent activity further comprises modeling the characteristics of user behavior against known or expected ones of timing intervals, visits to specific areas, user flow characteristics, and consumption patterns for actual human users.

19. The method of any one of embodiments 1-18 further comprising generating, as output data, usage heatmaps, identify user geo-location coordinates, identifying user device types and operating systems, calculating timing statistics between user navigation to and from on the interfaces pages, time spent on the interfaces, and counting a number of user views of a specific item within the interface.

20. The method of any one of embodiments 1-19 further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

21. A system for increasing advertisement engagement, the system comprising: a memory; and a hardware processor that, when executing computer executable instructions stored in the memory, is programmed to: receive, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content; receive, from a user device, a request to present the content within a content page; cause the content to be presented within the media content page, wherein the content comprising a reward content and one or both of a media content and an advertisement content, the reward content being associated with one or both of the media content and the advertisement content, the reward content presenting the reward characteristic; receive, from the user device, the user interaction input comprising an input indicating selection of the content; model the user interaction to increase advertiser engagement with users, by: identifying trend and viewing characteristics for the content by separating content views by one or more of episode, series, channel, specific viewing platform, and user, and assessing trends based on one or more of campaign consumption, views by campaign, most popular content based on a number of views, and most popular content based on time watched, compiling user-centric analytics at least indicative of counts based on the user interaction, evaluating social media performance in social media-specific analytics by episode, channel, or series at least indicative of counts of views and a user sentiment relative to the content, and detecting fraudulent activity relative to the content, by collecting observed characteristics of user behavior, and measuring observed characteristics of user behavior against benchmarked and normalized typical user behavior to identify usage patterns of actual human users and detect automated, machine-based users, and modeling the observed characteristics of user behavior against known or expected ones of timing intervals, visits to specific areas, user flow characteristics, and consumption patterns for actual human users; and transfer, by a rewards server, the reward to the user rewards account.

22. The system of embodiment 21, wherein the determining user-centric analytics further comprises counting a number of active users, all site visitors, new site visitors, new subscribers, returning users, users by specified geographical location, and users by operating system.

23. The system of embodiment 21 or 22, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces.

24. The system of any one or embodiments 21-23, wherein the analyzing fraudulent activity further comprises modeling the characteristics of user behavior against known or expected ones of timing intervals, visits to specific areas, user flow characteristics, and consumption patterns for actual human users.

25. The system of any one or embodiments 21-24 further comprising generating, as output data, usage heatmaps, identify user geo-location coordinates, identifying user device types and operating systems, calculating timing statistics between user navigation to and from on the interfaces pages, time spent on the interfaces, and counting a number of user views of a specific item within the interface.

26. The system of any one or embodiments 21-25 further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

27. A non-transitory computer-readable medium containing computer executable instructions that, when executed by a processor, cause the processor to perform a method for method for increasing advertisement engagement, the method comprising the steps of: receiving, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content; receiving, from a user device, a request to present the content within a content page; causing the content to be presented within the media content page, wherein the content comprising a reward content, a media content, and an advertisement content, the reward content being associated with both the media content and the advertisement content, wherein the media content comprises a media thumbnail associated with a video stream and the advertisement content comprises a brand graphic, and wherein the brand graphic and the reward content are presented as part of the media thumbnail; receiving, from the user device, the user interaction input comprising an input indicating selection of one of the media content, the advertisement content, and the reward content; modeling the user interaction to increase advertiser engagement with users, by: identifying trend and viewing characteristics for the content by separating content views by one or more of episode, series, channel, specific viewing platform, and user, and assessing trends based on one or more of campaign consumption, views by campaign, most popular content based on a number of views, and most popular content based on time watched, compiling user-centric analytics at least indicative of counts based on the user interaction, evaluating social media performance in social media-specific analytics by episode, channel, or series at least indicative of counts of views and a user sentiment relative to the content, and detecting fraudulent activity relative to the content, by collecting observed characteristics of user behavior, and measuring observed characteristics of user behavior against benchmarked and normalized typical user behavior to identify usage patterns of actual human users and detect automated, machine-based users, and modeling the observed characteristics of user behavior against known or expected ones of timing intervals, visits to specific areas, user flow characteristics, and consumption patterns for actual human users; and transferring, by a rewards server, the reward to the user rewards account.

28. The non-transitory computer-readable medium of embodiment 27, wherein the determining user-centric analytics further comprises counting a number of active users, all site visitors, new site visitors, new subscribers, returning users, users by specified geographical location, and users by operating system.

29. The non-transitory computer-readable medium of embodiment 27 or 28, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces.

30. The non-transitory computer-readable medium of any one of embodiments 27-29, wherein the analyzing fraudulent activity further comprises modeling the characteristics of user behavior against known or expected ones of timing intervals, visits to specific areas, user flow characteristics, and consumption patterns for actual human users.

31. The non-transitory computer-readable medium of any one of embodiments 27-30, further comprising generating, as output data, usage heatmaps, identify user geo-location coordinates, identifying user device types and operating systems, calculating timing statistics between user navigation to and from on the interfaces pages, time spent on the interfaces, and counting a number of user views of a specific item within the interface.

32. The non-transitory computer-readable medium of any of any one of embodiments 27-31 further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A method for increasing advertisement engagement, comprising:
  receiving, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content;
  receiving, from a user device, a request to present the content within a content page;
  causing the content to be presented within a media content page, wherein the content comprising a reward content and one or both of a media content and an advertisement content, the reward content being associated with one or both of the media content and the advertisement content, the reward content presenting the reward characteristic;
  capturing the user interaction input, by:
    capturing one or more user commands representing the user interaction with the content, the user interaction including one or more of a voice interaction with the content, a touch interaction with the content, or a sharing of the content that represent a selection of the content by the user, and
  receiving the user interaction input comprising an input indicating the selection of the content from the user interaction and an identification of selected content;
  modeling the user interaction input to track user interest in the selected content and determine a quantity of the reward to be transferred to increase advertiser engagement with users based on tracked user interest, by:
    identifying and tracking observed characteristics of user behavior, and associating the observed characteristics with the user interaction representing the selection of the content by the user, to determine the tracked user interest in the selected content and associate the transfer of the reward based on the occurrence of the user interaction with the selected content, and
    measuring the tracked user interest, by identifying trend and viewing characteristics based on the user interaction input for the selected content by separating content views by one or more of episode, series, channel, specific viewing platform, and user, and assessing trends extracted from data representing one or more of campaign consumption, views by campaign, most popular content based on a number of views, and most popular content based on time watched, and derived from the user interaction and the selected content,
    compiling user-centric analytics at least indicative of counts based on the user interaction input,
    evaluating social media performance in social media-specific analytics by episode, channel, or series at least indicative of counts of views and a user sentiment,
    applying a time-series analysis to correlate multiple characteristics representing the user interaction with events external to the selected content over specified time periods to derive specific reasons for the user interaction with the selected content from the trend and viewing characteristics, the user-centric analytics, and the social media-specific analytics, and
    detecting fraudulent activity relative to the selected content, by collecting observed characteristics of user behavior, weighting the observed characteristics of user behavior according to known behavioral characteristics of actual human users, and measuring weighted observed characteristics of user behavior against benchmarked and normalized typical user behavior to identify usage patterns of actual human users and detect and exclude automated, machine-based users, and modeling the weighted observed characteristics of user behavior against known or expected ones of timing intervals, visits to specific areas, user flow characteristics, and consumption patterns for actual human users to determine a correct reward quantity for the user interaction input to ensure that the tracked user interest represents actual user interest;

transferring, by a rewards server, the reward to the user rewards account based on the user interaction input with the selected content; and redeeming the reward by the user, and sending a redeemed reward from the user rewards account to the user, the redeemed reward including one or more of money, goods, and services.

2. The method of claim 1 wherein the reward characteristic is a quantity of rewards points, the quantity of rewards points are transferred to the user reward account, the quantity of rewards points redeemable for the one or more of money, goods, and services.

3. The method of claim 1 wherein the media content comprises a media thumbnail associated with a video stream, the method further comprising:

causing the video stream to play upon receiving from the user device the user interaction input indicating the selection of the media thumbnail, and presenting the reward graphic as part of the media thumbnail.

4. The method of claim 1 wherein the user interaction with the content comprises selecting the media content and/or selecting the advertisement content.

5. The method of claim 1 wherein user interaction input causes an advertisement page to be presented on the user device.

6. The method of claim 1 further comprising: receiving, from an advertiser device, a request to acquire a supply of rewards from which the reward is drawn.

7. The method of claim 1, wherein the determining user-centric analytics further comprises counting a number of active users, all site visitors, new site visitors, new subscribers, returning users, users by specified geographical location, and users by operating system.

8. The method of claim 7, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces, and modeling the characteristics of user behavior against known or expected ones of timing intervals, visits to specific areas, user flow characteristics, and consumption patterns for actual human users.

9. The method of claim 8, further comprising generating, as output data, usage heatmaps, identify user geo-location coordinates, identifying user device types and operating systems, calculating timing statistics between user navigation to and from on the interfaces pages, time spent on the interfaces, and counting a number of user views of a specific item within the interface.

10. The method of claim 1, further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

11. A system for increasing advertisement engagement, the system comprising:

a memory; and a hardware processor that, when executing computer executable instructions stored in the memory, is programmed to:

receive, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content;

receive, from a user device, a request to present the content within a content page;

cause the content to be presented within a media content page, wherein the content comprising a reward content and one or both of a media content and an advertisement content, the reward content being associated with one or both of the media content and the advertisement content, the reward content presenting the reward characteristic;

capture the user interaction input, by:

capturing one or more user commands representing the user interaction with the content, the user interaction including one or more of a voice interaction with the content, a touch interaction with the content, or a sharing of the content that represent a selection of the content by the user; and receive the user interaction input comprising an input indicating the selection of the content from the user interaction and an identification of selected content;

model the user interaction input to track user interest in the selected content and determine a quantity of the reward to be transferred to increase advertiser engagement with users based on tracked user interest, by:

identifying and tracking observed characteristics of user behavior, and associating the observed characteristics with the user interaction representing the selection of the content by the user, to determine the tracked user interest in the selected content and associate the transfer of the reward based on the occurrence of the user interaction with the selected content, and measuring the tracked user interest, by identifying trend and viewing characteristics based on the user interaction input for the selected content by separating content views by one or more of episode, series, channel, specific viewing platform, and user, and assessing trends extracted from data representing one or more of campaign consumption, views by campaign, most popular content based on a number of views, and most popular content based on time watched and derived from the user interaction and the selected content, compiling user-centric analytics at least indicative of counts based on the user interaction input, evaluating social media performance in social media-specific analytics by episode, channel, or series at least indicative of counts of views and a user sentiment, applying a time-series analysis to correlate multiple characteristics representing the user interaction with events external to the selected content over specified time periods to derive specific reasons for the user interaction with the selected content from the trend and viewing characteristics, the user-centric analytics, and the social media-specific analytics, and detecting fraudulent activity relative to the selected content, by collecting observed characteristics of user behavior, weighting the observed characteristics of user behavior according to known behavioral characteristics of actual human users, and measuring weighted observed characteristics of user behavior against benchmarked and normalized typical user behavior to identify usage patterns of actual human users and detect and exclude automated, machine-based users, and modeling the weighted observed characteristics of user behavior against known or expected ones of timing intervals, visits to specific areas, user flow characteristics, and consumption patterns for actual human users to determine a correct reward quantity for the user interaction input to ensure that the tracked user interest represents actual user interest; and transfer, by a rewards server, the reward to the user rewards account based on the user interaction input with the selected content; and redeem the reward by the user, and send a redeemed reward from the user rewards account to the user, the redeemed reward including one or more of money, goods, and services.

12. The system of claim 11, wherein the determining user-centric analytics further comprises counting a number of active users, all site visitors, new site visitors, new subscribers, returning users, users by specified geographical location, and users by operating system.

13. The system of claim 12, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces, and modeling the characteristics of user behavior against known or expected ones of timing intervals, visits to specific areas, user flow characteristics, and consumption patterns for actual human users.

14. The system of claim 13, further comprising generating, as output data, usage heatmaps, identify user geolocation coordinates, identifying user device types and operating systems, calculating timing statistics between user navigation to and from on the interfaces pages, time spent on the interfaces, and counting a number of user views of a specific item within the interface.

15. The system of claim 11, further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

16. A non-transitory computer-readable medium containing computer executable instructions that, when executed by a processor, cause the processor to perform a method for method for increasing advertisement engagement, the method comprising the steps of:

receiving, from an advertiser device, a parameter requesting a reward be associated with a content, the reward comprising a reward characteristic, wherein the parameter further comprises requesting that a transfer of the reward to a user rewards account be dependent on the occurrence of a user interaction input with the content;

receiving, from a user device, a request to present the content within a content page;

causing the content to be presented within a media content page, wherein the content comprising a reward content, a media content, and an advertisement content, the reward content being associated with both the media content and the advertisement content, wherein the media content comprises a media thumbnail associated with a video stream and the advertisement content comprises a brand graphic, and wherein the brand graphic and the reward content are presented as part of the media thumbnail;

capturing the user interaction input by:
 capturing one or more user commands representing the user interaction with the content, the user interaction including one or more of a voice interaction with the content, a touch interaction with the content, or a sharing of the content that represent a selection of the content by the user; and receiving, the user interaction input comprising an input indicating the selection of one of the media content, the advertisement content, and the reward content from the user interaction and an identification of selected content;

modeling the user interaction input to track user interest in the selected content and determine a quantity of the reward to be transferred to increase advertiser engagement with users based on the tracked user interest, by:
 identifying and tracking observed characteristics of user behavior, and associating the observed characteristics with the user interaction representing the selection of the content by the user, to determine the tracked user interest in the selected content and associate the transfer of the reward based on the occurrence of the user interaction with the selected content, and measuring the tracked user interest, by identifying trend and viewing characteristics based on the user interaction input for the selected content by separating content views by one or more of episode, series, channel, specific viewing platform, and user, and assessing trends extracted from data representing one or more of campaign consumption, views by campaign, most popular content based on a number of views, and most popular content based on time watched and derived from the user interaction and the selected content, compiling user-centric analytics at least indicative of counts based on the user interaction input, evaluating social media performance in social media-specific analytics by episode, channel, or series at least indicative of counts of views and a user sentiment, applying a time-series analysis to correlate multiple characteristics representing the user interaction with events external to the selected content over specified time periods to derive specific reasons for the user interaction with the selected content from the trend and viewing characteristics, the user-centric analytics, and the social media-specific analytics, and detecting fraudulent activity relative to the selected content, by collecting observed characteristics of user behavior, weighting the observed characteristics of user behavior according to known behavioral characteristics of actual human users, and measuring weighted observed characteristics of user behavior against benchmarked and normalized typical user behavior to identify usage patterns of actual human users and detect and exclude automated, machine-based users, and modeling the weighted observed characteristics of user behavior against known or expected ones of timing intervals, visits to specific areas, user flow characteristics, and consumption patterns for actual human users to determine a correct reward quantity for the user interaction input to ensure that the tracked user interest represents actual user interest; and transferring, by a rewards server, the reward to the user rewards account based on the user interaction input with the selected content; and redeeming the reward by the user, and sending a redeemed reward from the user rewards account to the user, the redeemed reward including one or more of money, goods, and services.

17. The non-transitory computer-readable medium of claim 16, wherein the determining user-centric analytics further comprises counting a number of active users, all site visitors, new site visitors, new subscribers, returning users, users by specified geographical location, and users by operating system.

18. The non-transitory computer-readable medium of claim 17, wherein the analyzing fraudulent activity further comprises calculating a timing interval between the user interactions, marking specific areas within interfaces on which the content is presented that are visited by users, tracking common user flow characteristics within the interfaces, and analyzing consumption patterns for the content via the interfaces, and modeling the characteristics of user behavior against known or expected ones of timing intervals, visits to specific areas, user flow characteristics, and consumption patterns for actual human users.

19. The non-transitory computer-readable medium of claim 18, further comprising generating, as output data, usage heatmaps, identify user geo-location coordinates, identifying user device types and operating systems, calculating timing statistics between user navigation to and from on the interfaces pages, time spent on the interfaces, and counting a number of user views of a specific item within the interface.

20. The non-transitory computer-readable medium of claim 16, further comprising applying the trend and viewing characteristics, the user-centric analytics, the social media-specific analytics, and the usage patterns of actual human users to associate the content with one or more of additional content, specific people, and specific organizations to reinforce a brand identity associated with one or both of the media content and the advertisement content, and identify desired affiliations for enhancing the advertiser engagement with the users.

* * * * *